(12) United States Patent
Hurlburt

(10) Patent No.: US 8,177,278 B1
(45) Date of Patent: May 15, 2012

(54) TRUCK OR TRAILER TAILGATE

(75) Inventor: Joseph C. Hurlburt, Millersville, PA (US)

(73) Assignee: Innovation By Contract, Inc., Millersville, PA (US)

( * ) Notice: Subject to any disclaimer, the term of this patent is extended or adjusted under 35 U.S.C. 154(b) by 88 days.

(21) Appl. No.: 12/804,282

(22) Filed: Jul. 19, 2010

Related U.S. Application Data

(60) Provisional application No. 61/271,314, filed on Jul. 20, 2009.

(51) Int. Cl.
*B60P 1/267* (2006.01)

(52) U.S. Cl. .......................................................... 296/50

(58) Field of Classification Search ............... 296/50, 296/10, 146.5, 146.8, 183.1, 183.2, 186.4, 296/26.11, 51, 57.1, 146.11, 37.6; 292/DIG. 29
See application file for complete search history.

(56) References Cited

U.S. PATENT DOCUMENTS

| | | | | |
|---|---|---|---|---|
| 557,550 A * | 4/1896 | Butcher et al. | .................. | 49/158 |
| 2,806,735 A * | 9/1957 | Smith | ............................ | 296/51 |
| 3,387,406 A * | 6/1968 | Coker et al. | .................... | 49/192 |
| 3,930,680 A * | 1/1976 | Littlefield | ........................ | 296/10 |
| 4,790,589 A * | 12/1988 | Moore et al. | .................... | 296/50 |
| 5,685,594 A * | 11/1997 | Harper | ............................ | 296/51 |
| 6,196,617 B1 * | 3/2001 | Beck | ........................ | 296/146.11 |
| 7,080,868 B2 * | 7/2006 | McClure et al. | ................. | 296/50 |
| 7,160,071 B2 * | 1/2007 | Legge | ........................... | 410/140 |
| 7,258,373 B2 * | 8/2007 | Plett et al. | ...................... | 292/210 |
| 7,303,222 B2 * | 12/2007 | Wilkins | ........................ | 296/37.6 |
| 7,481,479 B1 * | 1/2009 | Townson et al. | ................ | 296/51 |
| 7,677,626 B2 * | 3/2010 | Hanzel | ........................ | 296/26.11 |
| 2010/0289289 A1 * | 11/2010 | Bator et al. | ...................... | 296/55 |

* cited by examiner

*Primary Examiner* — Kiran B Patel

(74) *Attorney, Agent, or Firm* — Miller Law Group, PLLC

(57) ABSTRACT

A work bed with its low profile load bed recessed between fenders combined with a unique tailgate mounting system is disclosed. The combination is suited for fixed or dump mounting on a truck and fixed, dump, or selective tilt or dump use on a trailer. Tailgates systems are connected to one or both work bed sides, on one or a pair if symmetrically opposite inwardly inclined axes located outboard of the sides, allowing lateral tailgates or tailgate segments to be manually pivoted to longitudinal transport positions above the fenders where they can be secured. Some tailgates also pivot about lower or upper lateral pivot axes for added versatility.

15 Claims, 3 Drawing Sheets

TRUCK OR TRAILER TAILGATE

CROSS-REFERENCE TO RELATED APPLICATIONS

This application claims domestic priority on U.S. Provisional Patent Application Ser. No. 61/271,314, filed Jul. 20, 2009, the contents of which are incorporated herein by reference.

BACKGROUND OF THE INVENTION

This invention relates generally to the pivotal axis of a tailgate for use on a truck or trailer bed and, more particularly, to those beds recessed between tires and fenders commonly referred to as low profile.

Tailgates have been designed to pivot about vertical, horizontal or combinations of these axes and all include means for locking them in a closed position. Pickup truck full width tailgates typically only pivot about a lower edge transverse axis. A low profile trailer may also have a tailgate that pivots about a lower edge transverse axis so that the tailgate can serve as a loading ramp. Enclosed low profile trailers, such as horse trailers, often have three piece tailgates with the upper portion divided into nearly equal left and right segments that each open about a vertical laterally outboard axis. They can be swung and secured in longitudinal positions above the fenders. The lower tailgate portion pivots about a horizontal lower edge axis to serve as a loading ramp.

Dump trailers typically have a bed that is equipped with a fixed headboard and sides about two feet in height. Selections of three alternate tailgates are often offered. A tailgate type equal in height to the sides and referred to as barn doors, divides the tailgate into nearly equal left and right segments that each open about a vertical laterally outboard axis. Another similar height tailgate can be selectively pivoted about horizontal top or bottom edge axes. When pivoted about the upper axis, chains are often used to limit the tailgate opening for spreading a load as the bed is raised while traveling forward. The same tailgate, also restrained by chains, can be selectively pivoted about a horizontal lower edge axis to align with and therefore extend the load surface rearward. Some tailgates combine the features of both of the above types. A third type, sometime referred to as a landscape tailgate, is much taller and allows selection between two lateral pivot axes. The upper axis is usually located above the elevation of the bed sides but below the top of the tailgate. This axis is supported by extended bed corner posts. The lower pivot axis is located at the lower edge of the tailgate. This tailgate functions like the preceding tailgate, except that it can be pivoted about the lower axis to act as a loading ramp or the upper axis for dumping bulky materials. A trailer equipped to selectively tilt or dump, as taught by Pat. No. RE41126, could be equipped with any of these tailgates.

When the beds of open trucks or trailers are empty and their tailgates are closed, transport wind resistance is increased and fuel economy suffers. When pivoted horizontal about a lateral axis, tailgates lengthen trucks or trailers and can create parking or storage issues. Transport width can't be achieved when fully opened vertical axis barn door type tailgates strike the fenders of low profile work beds.

It would be desirable to provide a tailgate pivot system that allowed either a full width or divided tailgate to be swung to a longitudinal position beside the bed of a truck or low profile trailer. It would also be desirable that in this position the tailgate could be secured. It would also be desired that in this position the tailgate or its support system wouldn't increase transport width. It would also be desired that in this position transport wind resistance could be reduced. It would also be desired that the same tailgate could selectively pivot about a lower lateral axis for bed extension or for use as a loading ramp. It would also be desired that, when used on a dumping bed, this tailgate could selectively pivot about an upper lateral pivot axis for spreading loose materials as the bed travels forward while being raised.

SUMMARY OF THE INVENTION

It is an object of this invention to overcome the disadvantages of the prior art by providing a pivot axis that allows the tailgate of a truck or trailer's low profile load bed to be pivoted from a transverse vertical plane to a longitudinal transport position beside the load bed.

It is another object of this invention to provide a mounting structure for pivoting a tailgate or tailgate segment approximately three quarters of a revolution about a non-vertical axis for transport storage above a fender.

It is another object of this invention to provide a pair of pivot axes that allow left and right barn door type tailgate segments to be pivoted from a transverse vertical plane to transport positions above their adjacent fenders.

It is a further object of this invention to provide a pivot axis that allows a full width tailgate or two axes that allow tailgate segments to be pivoted from a transverse vertical plane to a longitudinal vertical plane beside the load bed of a truck or low profile trailer.

It is another object of this invention that in addition to each of the above objects the tailgate support structure also accommodates lower and or upper lateral tailgate pivot axes.

It is a feature of this invention that tailgates can be selectively transported in their closed transverse vertical plane or in a longitudinal transport position beside the load bed.

It is an advantage of this invention that, when tailgates are transported in their selective longitudinal transport positions, wind resistance and fuel consumption are reduced.

It is another feature of the invention that full width or segmented tailgates can be secured in either their closed transverse vertical plane or in longitudinal transport positions beside the load bed.

It is another advantage of this invention that, when full width or segmented tailgates are secured in their longitudinal transport positions beside the load bed, some loading and unloading activities are facilitated.

It is another advantage of the invention that, a full width or segmented and locked together tailgate can be manually pivoted about an upper or lower lateral pivot axis and selectively restrained by pivot limiting members and the full width tailgate or each unlocked tailgate segment can be manually pivoted from its closed position to its selective longitudinal transport position.

It is a further object of this invention to provide a tailgate mounting support system which is durable in construction, inexpensive to manufacture, carefree of maintenance, facile in assemblage, simple and effective in use.

These and other objects, features and advantages are accomplished according to the instant invention by giving at least one end of the tailgate a unique outboard axis of rotation that's inclined inward or inward and rearward. The optimum orientation of this axis would be influenced by the low profile bed's fender position, shape and location relative to the lower edge of the closed tailgate. This axis allows the tailgate to be manually pivoted to and from its closed transverse vertical position to a longitudinal transport position above a fender. Including a connecting link between the tailgate and the inclined axis adds the ability to pivot the tailgate about lower and or upper axes for increased functionality. Plus, a symmetrically opposite inclined axis and connecting link, positioned on the opposite side of the bed, would allow the use of a segmented tailgate with additional versatility.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
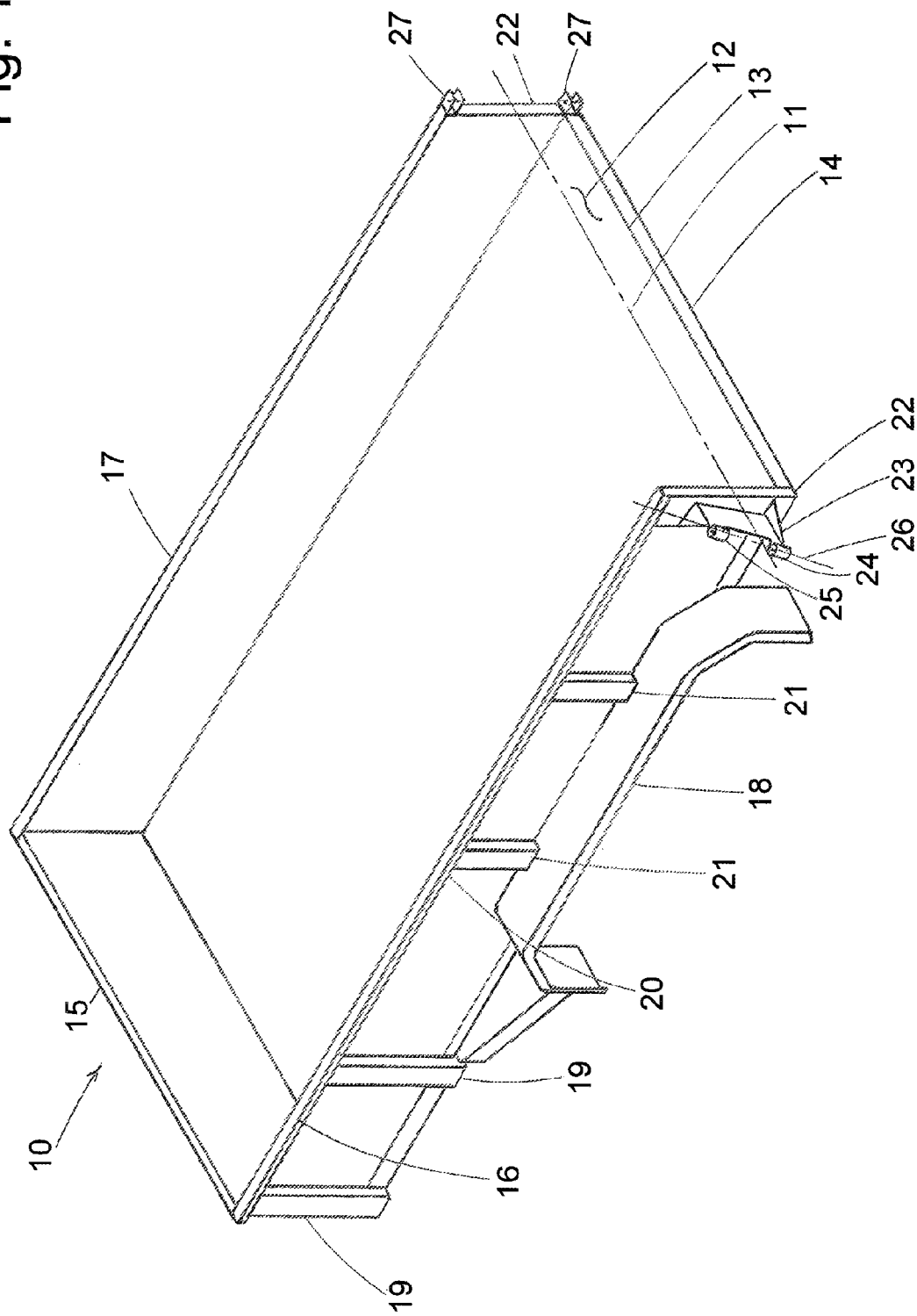
FIG. 1 is a schematic left rear perspective view of a work bed as could be used on a truck or low profile trailer incorporating the principles of the instant invention.

Referring now to the FIGS. 1-4 the details of the truck or trailer tailgate of the instant invention can best be seen. Any reference to left, right, front or back are used as a matter of convenience and are determined by facing the normal direction of highway travel by the truck or trailer (neither shown) that would carry the work bed and its tailgate system. In FIG. 1, work bed 10 is configured to be suitable for use as a dump bed or a tilt and dump bed per the teaching of Pat. No. RE41126. A lateral dump pivot axis 11 is located below and near the rear of work bed 10. While dumping a load, a lift system (not shown) would raise the front of work bed 10 while pivoting it about dump pivot axis 11. Floor 12 defining load bed 13, bed frame 14, headboard 15, left side 16 and right side 17 are the primary components of work bed 10. Left side 16 is shown to include fender 18, a first and second long post 19 bridging from bed frame 14 to top channel 20, a first and second short post 21 bridging from fender 18 to top channel 20 and rear post 22 bridging from bed frame 14 to top channel 20. Right side 17 includes like components. Attached to left side 16 rear post 22 is left support 23 for aligning lower hub 24 and upper hub 25 defining left inclined axis 26. As shown, left inclined axis 26 reaches inward and rearward equally. The rear surface of right side 17 rear post 22 carries two U brackets 27 with their horizontal rearward reaching legs including holes to receive vertical locking pins 28 (not shown).

Figure 2:
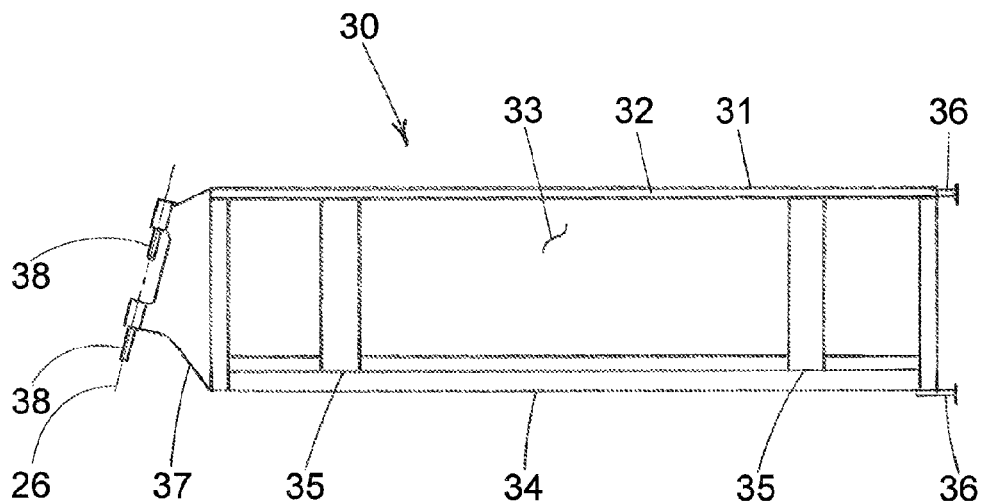
FIG. 2 is a rear elevational view of a single axis tailgate system incorporating the principles of the instant invention.

FIG. 2 shows a schematic left rear perspective view of single axis tailgate system 30 for use with work bed 10. As with headboard 15, left side 16 and right side 17 the top edge 31 of single axis tailgate 32 panel 33 includes a formed channel. An angle is formed at the lower edge of panel 33 reinforced by base channel 34. Vertical channels 35 also strengthen panel 33. The right end of panel 33 extends to the rear end of right side 17. Pins 36 are included in single axis tailgate 32 for engagement with U brackets 27 and retention by locking pins 28 (not shown). The left end of panel 33 and base channel 34 extend past left side 16 for connection with hinge 37 and hinge pins 38 aligned for engagement with lower hub 24 and upper hub 25 on left inclined axis 26. The inward inclination of left inclined axis 26 lifts single axis tailgate 32 above fender 18. With an equal rearward inclination left inclined axis 26 will assure that single axis tailgate 32 attain a vertical longitudinal transport position beside the bed where it can be easily secured (not shown).

Figure 3:
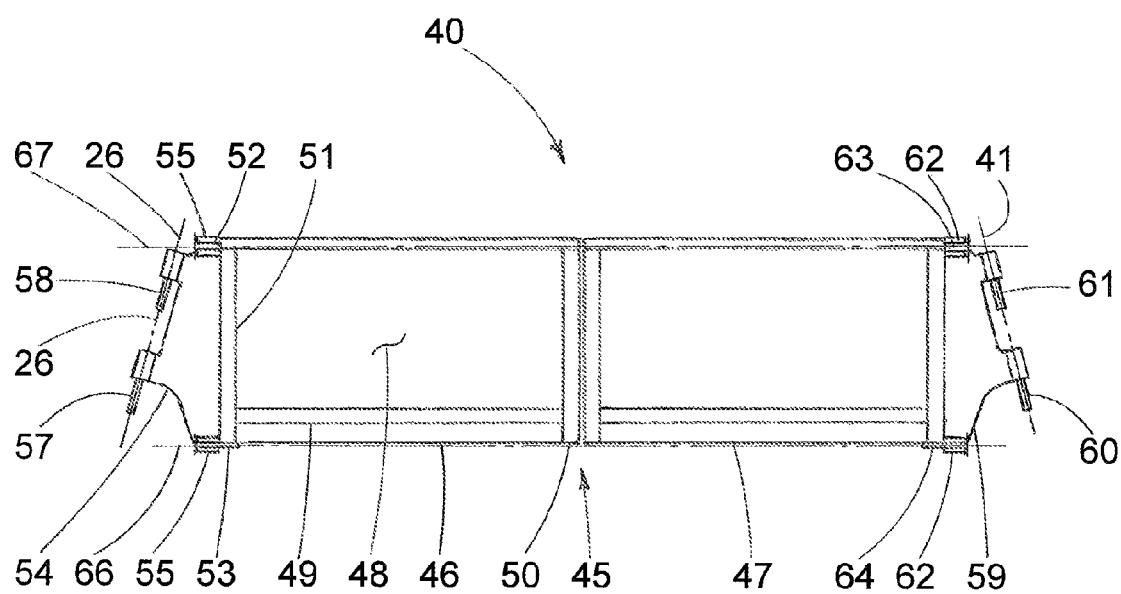
FIG. 3 is a rear elevational view of a four axis segmented tailgate system incorporating the principles of the instant invention.

FIG. 3 shows four axis segmented tailgate system 40. It differs from single axis tailgate system 30 in significant ways (The segments can separately pivot about symmetrically opposite inclined axes and together about either of the inclined axes or about two lateral axes). Four axis segmented tailgate system 40 connects to load bed 10 modified by the removal of U brackets 27 and with left support 23, left lower hub 24, left upper hub 25 and left inclined axis 26 symmetrically duplicated for connection with right side 17 rear post 22 creating right inclined axis 41, right upper hub 42 (not shown), right lower hub 43 (not shown) and right support 44 (not shown). Segmented tailgate 45 includes left segment 46 and symmetrically opposite right segment 47. Left segment 46 includes panel 48 with top and bottom edges formed the same as panel 33, lower channel 49, inner channel 50, outer channel 51, left upper pin 52 and left lower pin 53 both identical to pin 36. Left upper pin 52 and left lower pin 53 connect with left inclined axis link 54 left U brackets 55 equivalent to work bed 10 U brackets 27 with horizontal rearward reaching legs including holes to receive vertical locking pins 56 identical to locking pins 28 (not shown). Left inclined axis link 54 includes lower hinge pin 57 and upper hinge pin 58 for engagement with lower hub 24 and upper hub 25 on inclined axis 26. Right inclined axis link 59 symmetrically opposite to left inclined axis link 54 includes lower hinge pin 60 and upper hinge pin 61 for engagement with lower hub 43 (not shown) and upper hub 42 (not shown) on right inclined axis 41. Right inclined axis link 59 also includes right U brackets 62 for connection with right segment 47 upper pin 63, lower pin 64 and locking pins 65 (not shown). With left segment 46 unlocked from right segment 47, left segment 46 is free to be manually pivoted about left inclined axis 26 and right segment 47 is free to be manually pivoted about right inclined axis 41 to longitudinal transport positions beside load bed 28 and locked (not shown). With segmented tailgate 45 closed, left segment 46 and symmetrically opposite right segment 47 can be locked together (not shown) and left segment 46 lower pin 53 aligns with right segment 47 lower pin 64 defining lower lateral axis 66 and upper pin 52 of segment 46 aligns with upper pin 63 of segment 47 to define upper lateral axis 67. Locking pin 56 (not shown) can be removed from upper left U bracket 55 and locking pin 65 (not shown) can be removed from upper right U bracket 62 allowing segmented tailgate 45 to pivot about lower lateral axis 66 and extend the load bed or to act as a loading ramp while its rotation is limited by typical chains (not shown). Locking pin 56 (not shown) can be removed from lower left U bracket 55 and locking pin 65 (not shown) can be removed from lower right U bracket 62 allowing segmented tailgate 45 to pivot about upper lateral axis 67, while typically restrained by chains (not shown), for spreading loose materials from load bed 13 as work bed 10 pivots about axis 11 while traveling forward.

Figure 4:
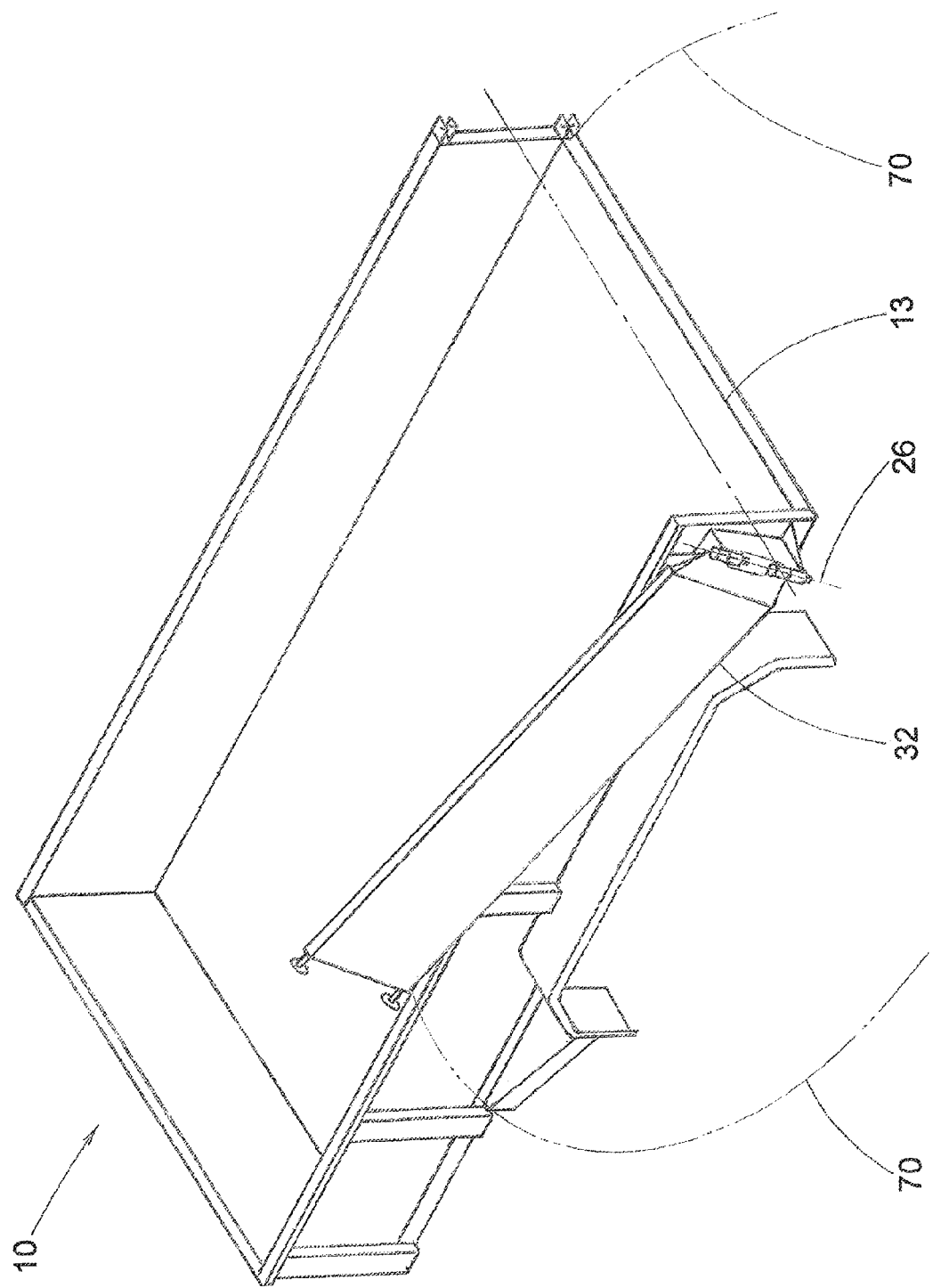
FIG. 4 is a schematic left rear perspective view of a work bed with its tailgate pivoted, about an axis inclined inward and rearward, to a vertical longitudinal plane beside the work bed and above the left fender.

FIG. 4 shows work bed 10 with single axis tailgate 32 pivoted about inclined axis 26 to its longitudinal transport position beside load bed 13 where it can be locked (not shown). Arc 70 shows the path traveled by the lower right corner of single axis tailgate 32 in moving from its closed position. The movement shown for this tailgate is typical of the inclined axis pivoting of any tailgate.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts as based upon the description may be employed in other embodiments without departing from the scope of the invention. For example, it should be understood that any combination of inward and rearward inclination on the inclined axis, moving the single inclined axis from the left side to the right side fall within the scope of this invention.

The primary purpose of a tailgate is to provide a wall to close the rear opening of a work bed and thereby secure loads. However, they can also serve to extend load beds, act as loading ramps or assist in controlling the off loading of some materials. Opening the tailgate can also facilitate loading or unloading. Many work beds have their bed frames and load beds positioned well above truck or trailer tires. This allows full width or segmented tailgates to pivot about vertical axes to longitudinal positions when opened.

Referring now to FIGS. 1-4, in FIG. 1 a work bed with its load bed recessed between fenders (often referred to as low profile) is shown equipped with left inclined pivot axis 26. FIG. 2 shows single axis tailgate system 30 for pivotal connection with pivot axis 26 and closed position lock mechanism for single axis tailgate 32. Inwardly inclined axis 26 allows tailgate 32 to selectively pivot from a closed lateral position to a longitudinal position above fender 18 where it can be locked. As shown by FIG. 3, left segment 46 can pivot about left inclined axis 26 and right segment 47 can pivot about right inclined axis 41. It can also be visualized that with left segment 46 and right segment 47 locked together segmented tailgate 45 acts as a full width tailgate that, with the inclusion of left inclined axis link 54 and right inclined axis link 59, can be pivoted about either left inclined axis 26 or right inclined axis 41. It is also shown that with left inclined axis link 54 and right inclined axis link 59 lower lateral pivot axis 66 and upper lateral pivot axis 67 add versatility. It can be readily visualized that modifications to add left inclined axis link 54 to FIG. 2 single axis tailgate 32 could create a three axis tailgate with the benefits provided by lower lateral pivot axis 66 and upper lateral pivot axis 67. Further, it can be visualized that such a tailgate could extend well above upper lateral pivot axis 67. With lengthened rear posts and the addition of an elevated third lateral axis for selective attachment, this tailgate could serve as a landscape tailgate within the scope of the instant invention.

Having thus described the invention, what is claimed is:

1. A work body suitable for use on a truck or trailer comprising:
    a bed frame with first and second laterally spaced sides extending above and defining lateral limits of a load bed; and
    a tailgate system including a tailgate pivotally attached to said bed frame for movement about an inclined axis located outboard of the adjacent side of said load bed.

2. The work body of claim 1 wherein said bed frame further includes fenders extending above the load bed outboard of the respective sides and the tailgate can be pivoted about the inclined axis to a longitudinal position above a fender.

3. The work body of claim 1 wherein said tailgate includes a locked end spaced from said inclined axis, the locked end of the tailgate including laterally extending lower and upper tailgate pins for engagement with a lock mechanism.

4. The work body of claim 2 wherein the tailgate can be locked in a longitudinal position above the fender corresponding to said inclined axis.

5. The work body of claim 3 wherein a link pivots about said inclined axis and provides for locked engagement with lower and upper tailgate pins extending laterally from a near end of the tailgate, each of said lower and upper tailgate pins on said near end of said tailgate being aligned with corresponding lower and upper tailgate pins extending from the locked end of the tailgate.

6. The work body of claim 5 wherein the aligned lower tailgate pins on said near end and said locked end of said tailgate define a lower lateral axis about which the tailgate can pivot when the upper tailgate pins are unlocked and the aligned upper tailgate pins define an upper lateral axis about which the tailgate can pivot when the lower tailgate pins are unlocked.

7. The work body of claim 1 wherein an upper end of the inclined axis is equally positioned inwardly and rearwardly relative to a lower end of the inclined axis.

8. A work body suitable for use on a truck or trailer comprising:
    a bed frame with first and second laterally spaced sides extending above and defining lateral limits of a load bed; and
    a tailgate system including a segmented tailgate defining left and right segments pivotally attached to said bed frame, each of said left and right segments being independently movable about a respective inclined axis located outboard of the respective said side of said bed frame, the left and right segments being selectively locked together to span between said first and second sides.

9. The work body of claim 8 wherein the bed frame further includes first and second fenders extending above the load bed and being respectively located outboard of the respective sides, each of the left and right tailgate segments being pivotable about the corresponding inclined axis for movement to a longitudinal position above a the corresponding fender.

10. The work body of claim 9 wherein each of the left and right tailgate segments can be locked independently in a longitudinal position above the corresponding fender.

11. The work body of claim 10 wherein symmetrically opposite links pivot about said respective inclined axes and provide for selective locked engagement with lateral lower and upper pins extending from an end of each tailgate.

12. The work body of claim 11 wherein the lower pins of the left and right tailgate segments when aligned define a lower lateral axis about which the tailgate segments can pivot when the left and right tailgate segments are locked together and when the upper pins of the left and right tailgate segments are unlocked, the upper pins of the left and right tailgate segments when aligned define an upper lateral axis about which the tailgate segments can pivot when the left and right tailgate segments are locked together and when the lower pins of the left and right tailgate segments are unlocked.

13. The work body of claim 8 wherein an upper end of the inclined axis is equally positioned inwardly and rearwardly relative to a lower end of the inclined axis.

14. The work body of claim 11 wherein the left and right tailgate segments when locked together can be unlocked from either one of the symmetrically opposite links to allow the locked together left and right tailgate segments to pivot about the inclined axis of the opposite link.

15. The work body of claim 14 wherein the locked together left and right tailgate segments are portions of a single tailgate.

* * * * *